J. PACKER.
Feed Rack.
No. 23,386.
Patented March 29, 1859.
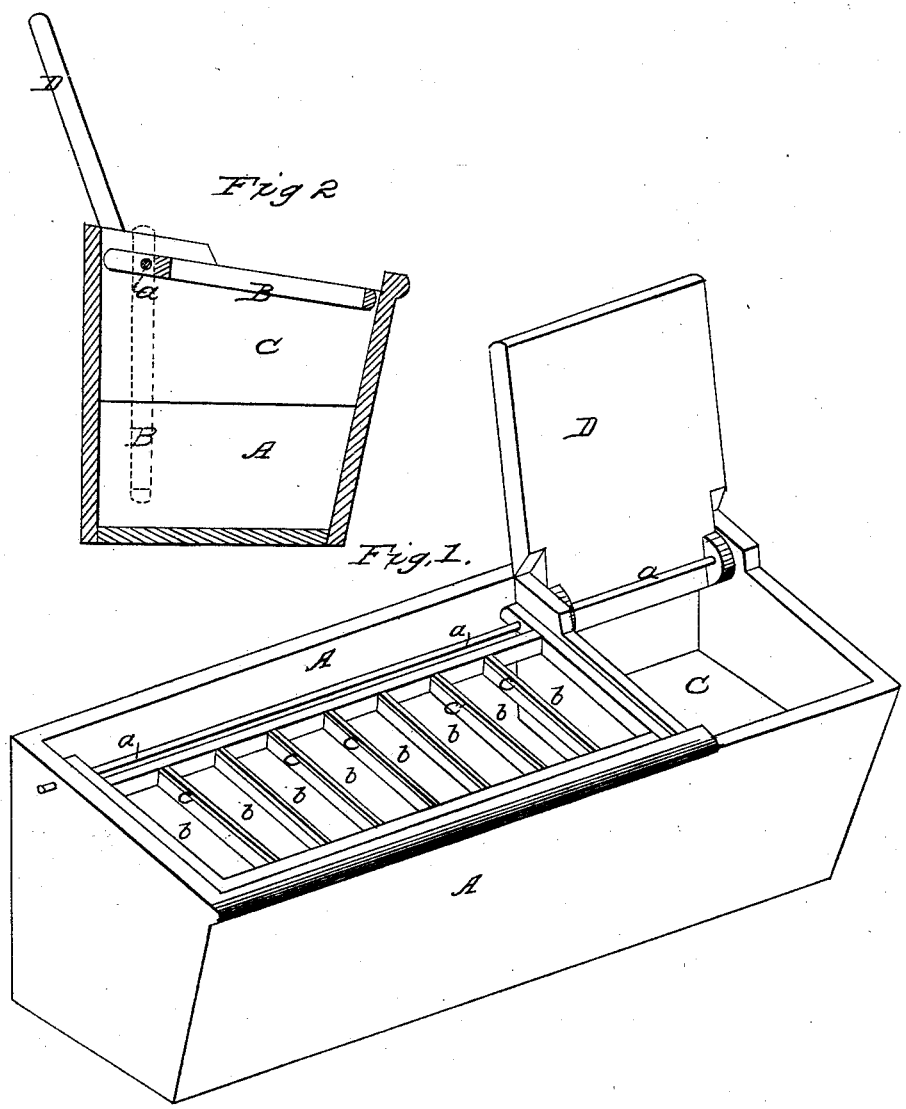

UNITED STATES PATENT OFFICE.

JOHN PACKER, OF PHILADELPHIA, PENNSYLVANIA.

HAY-MANGER.

Specification of Letters Patent No. 23,386, dated March 29, 1859.

*To all whom it may concern:*

Be it known that I, JOHN PACKER, of the city and county of Philadelphia and State of Pennsylvania, have invented a certain new and useful Improvement in Racks for Hay-Mangers, which I denominate the "Falling Rack;" and I do hereby declare the following to be a full, clear, and exact description of the construction and operation of the same, reference being had to the accompanying drawings, making a part of this specification, in which—

Figure 1 represents a perspective view of the rack and manger, and Fig. 2, represents a vertical cross section through the rack and manger.

Similar letters of reference where they occur in the separate figures denote like parts of the structure in both.

The object of my invention is to prevent the horses from wasting their hay, which they will do under any system of mangers heretofore constructed, and of which I have any knowledge. And the nature of my invention consists in combining with the hay manger, box, or receptacle a falling rack, which lying on top of the hay prevents the horse or horses throwing it out, and which rack continues to fall and lie upon the hay so long as any remains in the manger—the horse getting at the hay through the slats of the rack.

To enable others skilled in the art to make and use my invention, I will proceed to describe the same with reference to the drawings.

A represents a manger or box for containing hay. It may be made of any suitable size or form and of any proper material, and faced, lined or tipped with metal to prevent their being gnawed or bitten.

B, is a rack of wood or iron or parts of each. It is hinged (as herein represented) to the manger by a rod $a$, which runs through from end to end of the manger, though any other way of fastening the rack, or retaining it in proper position, so as to continue to fall or settle down as the hay is consumed or drawn from under it will serve the same end. The spaces $b$, between the slats $c$ of the rack need only be wide enough to prevent the horses from throwing out the hay, as they can readily draw through said spaces what hay they eat.

When the manger is empty, and the rack is in the position shown by dotted lines in Fig. 2, it is first raised up out of the manger, and the latter is then filled with hay, and the falling rack let down upon it. This is all that it is necessary to be done, the rack continuing on top of the hay so long as any remains in the manger. The bottom of the manger I make tight so as to hold and save the feed which the horses drop into it from the feed box while eating.

C, is the grain box. It is placed at the end of the hay manger (and there may be one at each end of it), and is furnished with a lid D which as well as the box should be lined or edged with metal to protect it from rats, &c. In systematizing a stable for horses these things are very important, and the saving or loss in a large establishment is almost incredible.

In using my manger and feed box, I place the feed in the box at any time when most convenient to myself, and shut down the lid. If the horses come in too much heated to eat grain, I allow the lid to remain closed. When it is proper for the horses to eat their grain, I simply throw up the lid and thus many horses can be served by one attendant.

Having thus fully described the nature and object of my invention, what I claim therein as new and desire to secure by Letters Patent is—

In combining with a hay manger, a falling rack B, to prevent the horses from pulling out and unnecessarily wasting the hay therein, and as herein described and represented.

JOHN PACKER.

Witnesses:
A. B. STOUGHTON,
THOS. H. UPPERMAN.